United States Patent Office 3,079,370
Patented Feb. 26, 1963

3,079,370
PEROXIDE CURED POLYETHYLENE
Frank M. Precopio and Alfred R. Gilbert, Schenectady, N.Y., assignors to General Electric Company, a corporation of New York
No Drawing. Filed May 18, 1955, Ser. No. 509,388
15 Claims. (Cl. 260—94.9)

This invention relates to polyethylene-peroxide compositions and the cured products thereof. More particularly, this invention relates to compositions comprising an admixture of polyethylene and a peroxide of the following formula:

$$R-O-O-R'$$

where R and R' are each hydrocarbon radicals containing a tertiary carbon atom attached to each oxygen atom of the peroxide linkage and at least one of the R's contains at least one aromatic group; and the cured products thereof. This invention also relates to the process of producing these products.

In the gamut of polymeric materials which have evolved in recent years, polyethylene has provided to be one of the most popular. It has had wide usage as an insulating material, as a container material, as a conduit material, etc. The fabrication, molding, extrusion, and calendering of polyethylene are readily accomplished by standard methods, thus facilitating its use for many purposes. Despite all this, however, the applications of polyethylene are greatly limited by its lack of form stability, that is, the ability to retain the particular shape at elevated temperatures and by its solubility in certain solvents. Some improvements in these properties have been obtained by curing polyethylene with peroxides but these products are subject to some deficiencies.

One of the difficulties in treating polyethylene with peroxides is that polyethylene tends to prematurely cure to some extent while the peroxides are being blended into the polymer during the milling operation. As a result, while the admixed composition is being shaped, stresses are added to the product, which stresses exert themselves when the formed product is subjected to heat even below its flow point. This results in distortions so that the finished product does not retain the desired shape. This stressed condition and consequences thereof will hereafter be referred to as "plastic memory." Although cured polyethylene possesses an elevated flow point resulting in enhanced high temperature utility, the presence of plastic memory results in distortion even below the flow point, thus making it extremely difficult to obtain a smoothly shaped cured product.

In British Patent 659,958 there is disclosed a method of avoiding plastic memory by the use of a tertiary peroxide of the formula A—O—O—B as a polyethylene curing agent where A and B are saturated, non-aromatic hydrocarbon radicals, and the carbon atom attached to each oxygen of the peroxide linkage is tertiary, with the total number of carbon atoms in A and B being at least eleven and, preferably, not more than sixteen.

The patentee states therein that "The invention is dependent on a quite specific behaviour or effect of the tertiary peroxide. The number of tertiary peroxides having such specific behaviour is decidedly limited and the present invention is restricted to the particular group of tertiary peroxides which have been found to exhibit this behaviour."

We have now discovered that polyethylene can be cured with another class of peroxides whereby the cured product has increased form stability at elevated temperatures, resistance to certain solvents, improved tensile strength, tear strength, etc. without exhibiting "plastic memory." This is accomplished by incorporating a peroxide of the formula R—O—O—R', where R and R' are each hydrocarbon radicals containing a tertiary carbon atom attached to each oxygen atom of the peroxide linkage and at least one of the R's contains at least one aromatic group, and curing the peroxide-containing polymer.

The peroxides of the present invention have the following formula $$R-O-O-R'$$

where R and R' which may or may not be similar are radicals selected from the group consisting of

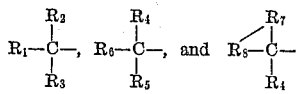

where $R_1$, $R_2$, $R_3$, $R_4$, $R_5$ and $R_6$ comprise alkyl radicals such as methyl, ethyl, propyl, butyl, pentyl, hexyl, heptyl, octyl, nonyl, decyl, undecyl, octadecyl, etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopentyl, tert-butyl-methylcyclohexyl, isopropylcyclohexyl, etc.; cycloalkyl-alkyl radicals such as cyclopropylmethyl, cyclopentylethyl, cyclohexylpropyl, etc.; aryl radicals such as phenyl, biphenyl, naphthyl, anthracyl, etc.; alkaryl radicals such as tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is di-phenylcyclohexyl peroxide,

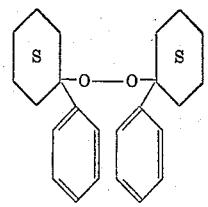

At least one member of the group consisting of $R_1$, $R_2$, $R_3$, $R_4$, $R_5$, $R_6$, $R_7$ and $R_8$ contains at least one aromatic group. Mixtures of these peroxides may also be used.

In addition, these peroxides may contain inorganic groups, such as halogens, nitro groups, etc., for example, chlorophenyl, bromophenyl, nitrophenyl, etc.

Particularly useful peroxides falling within the scope of the broad general formula are those corresponding to the formula

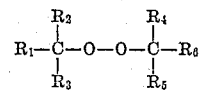

wherein $R_1$, $R_2$, $R_3$, $R_4$, $R_5$ and $R_6$ are as previously defined.

Although di-α-cumyl peroxide, also known as bis (α,α-dimethylbenzyl) peroxide,

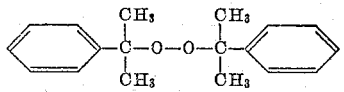

is the most preferred peroxide, other preferred peroxides are tert-butyl-α-cumyl peroxide, also known as α,α-dimethylbenzyl-tert-butyl peroxide,

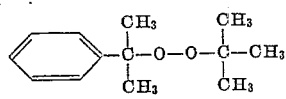

tert-butyltriphenyl methyl peroxide,

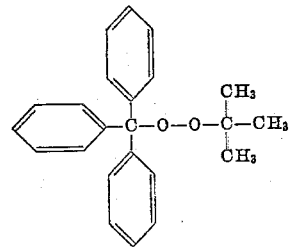

and di-α, p-cymyl peroxide, also known as bis(α,α-dimethyl-p-methylbenzyl) peroxide,

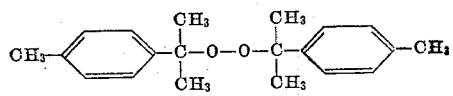

The peroxides of this invention may be prepared by any of the methods known to the art. For example, di-α-cumyl peroxide can be prepared by the method described by Kharasch et al. in the Journal of Organic Chemistry 15, 753–62 (1950), tert-butyl-α-cumyl peroxide by the method of Kharasch et al. in the Journal of Organic Chemistry 15, 775–781 (1950); tert-butyl triphenylmethyl peroxide by the method of Kharasch et al. in the Journal of Organic Chemistry 16, 1458–1470 (1951); etc. Some of the peroxides are commercially available, for example, di-α-cumyl peroxide, sold by the Hercules Powder Co. of Wilmington, Delaware.

In general, the invention is carried out by intimately mixing the peroxide and the polyethylene and subsequently curing this admixed composition. The admixture of peroxide and polyethylene can be accomplished by any convenient method. For example, the polymer and peroxide can be mixed directly on a two-roll rubber mill with or without the use of solvents. If desired, other mixing apparatus may be used, such as a Banbury mixer, etc. The mixing of the polyethylene and the peroxide may be accomplished over a wide range of temperatures depending on the peroxide employed. Although it may be admixed with the peroxide at room temperature if the polyethylene is sufficiently finely divided, it is generally done at elevated temperatures, such as about 100–135° C. If the peroxide has a relatively long half life at a higher temperature, the upper limit for this operation may be extended to a point at which the peroxide is not appreciably destroyed. In this manner, a homogeneous mixture of polyethylene and peroxide is obtained.

Thereupon, this mixture may be fabricated, molded, extruded or callendered, etc., by suitable methods. The temperature at which the shaping operation is effected may be varied widely depending on the specific peroxide or whether it is desired that shaping and curing be accomplished in one operation. If desired, the composition can be cured after shaping by a final heat treatment at about 150° C. or higher but below the decomposition temperature of the polymer. Curing of the peroxide-polyethylene composition can be effected at ordinary pressures or at superatmospheric pressure, such as from 10–1000 pounds per square inch or more in a mold or press. If surface cure alone is desired without affecting the interior, polyethylene containing no peroxide may be extruded into a solution containing the peroxide and thereupon heat cured. Thin films or filaments extruded and heated in this manner will be sufficiently cured throughout.

The optimum amount of the tertiary peroxide to be incorporated into the composition depends on the peroxide selected, the time and temperature of the heat treatment and the degree of cure desired in the polymer. Generally, if the peroxide composition is cured between 150–200° C., from 0.3–20% of the tertiary peroxides based by weight of the polymer may be used, but preferably 0.5–5%. However, if polyethylene of greatly reduced thermoplasticity is desired, greater amounts of peroxide may be used. Of course, the time and temperature required for the cure will depend on the specific peroxide as well as the temperature employed. In general, if from 0.5 to 5% of peroxide is used in the composition and the composition is cured at 150–200° C., the polyethylene may be sufficiently cured in from 5 minutes to 30 minutes or more.

The products of this curing process are characterized by decreased solubility in organic solvents, decreased thermoplasticity, enhanced tensile strength at both room and elevated temperatures and enhanced elevated temperature tear strength, etc. as compared to uncured polyethylene. Although uncross-linked polyethylene will totally dissolve in solvents, polyethylene which has been sufficiently cured will not dissolve at elevated temperatures to an appreciable extent but will swell when in contact with the solvents. The degree of cure in these polymers can be evaluated by the amount of swelling which occurs when the samples are placed in contact with certain solvents. Since resistance of polymeric materials to solvents is a measure of degree of cure, this is a convenient method of measuring the curing efficiency of these peroxides. Toluene and other aromatic or substituted aromatic compounds, such as xylene, mesitylene, nitrobenzene, benzene, etc., and mixtures of such compound are solvents for polyethylene at elevated temperatures (90–100° C.). Another important advantage of this invention is the fact that at temperatures above the softening point of the ordinary available polyethylene (100–110° C.) and under certain loads, the cross-linked polyethylene of this invention will flow only to a small extent whereas the uncured polyethylene will completely deform. Furthermore, peroxide-cured polyethylene is more resilient and thus more resistant to permanent deformation as compared to uncured polyethylene.

In addition to the above-named properties, the polyethylenes of this invention do not exhibit plastic memory. Thus, the cured polyethylene compositions of our invention will preserve their shape without distortion even at elevated temperatures which are below the flow point of the cured polymer. In contrast to this, a benzoyl peroxide-cured polyethylene when heated to 120° C. (below its flow point) for 10 minutes was extremely distorted. The polyethylene referred to herein is a polymeric material, usually solid (although liquid polyethylene is not precluded) formed by the polymerization of ethylene at high temperatures and pressures. It may range from a molecular weight of 2,000–30,000 or more for the solid form of polyethylene. It is more particularly described in U.S. Patent 2,153,553 and in "Modern Plastics Encyclopedia," New York (1949), pages 268–271. Examples of commercially available polyethylene which can be employed in the practice of the instant invention are polyethylenes sold by the Bakelite Corporation, Boundbrook, New Jersey, such as DYNH; Du Pont polyethylene resin sold under the trade name "Alathon;" and the "Marlex" polyethylene of Phillips Petroleum Co., etc.

In order that those skilled in the art may better understand how the present invention may be practiced, the following examples are given by way of illustration and not by way of limitation. All parts are by weight.

A total of 100 parts of polyethylene were added in the form of small cubes to a hot rubber mill (120–130° C.) until it formed a continuous sheet. At this point, various amounts of crystalline di-α-cumyl peroxide were milled into the sheet. The total time on the mill varied from 5–10 minutes. This material was pressed into a 50-60 mil sheet by heating in a press for 30 minutes at 160° under 1000 p.s.i. The tensile, elongation, and tear resistance of this sheet were determined in a Scott tester. These results are presented in Table I.

*Table 1*

PHYSICAL PROPERTIES OF POLYETHYLENE[1]

| Ex. | Percent | Peroxide | Room Temperature | | 145° C. Tensile Strength (p.s.i.) | Elong. (Percent) | Tear Strength, lb./in. | |
|---|---|---|---|---|---|---|---|---|
| | | | Tensile Strength (p.s.i.) | Elong. (Percent) | | | Room Temp. | 145° C. |
| 1 | none | | 1,538 | 715 | 0 | 0 | 610 | 0 |
| 2 | ½ | DCP[2] | 2,220 | 600 | 85 | 800 | | |
| 3 | 1 | DCP | 2,245 | 580 | 81 | 325 | 466 | 13 |
| 4 | 2 | DCP | 2,140 | 710 | 81 | 750 | | |
| 5 | 3 | DCP | 2,085 | 500 | 85 | 225 | | |
| 6 | 5 | DCP | 2,010 | 425 | 80 | 175 | | |
| 7 | 10 | DCP | 1,665 | 300 | 107 | 0 | | |

[1] Alathon #1.
[2] di-α-cumyl peroxide, weight percent based on polyethylene.

EXAMPLE 8

A total of 100 parts of polyethylene (Alathon #7) in small cubes was slurried with a solution of 5 parts of di-α-cumyl peroxide (Hercules Powder Company) in methanol. Thereupon methanol was removed under vacuum leaving the polymer cubes coated with the crystalline peroxide. This mixture was pressed for 1 hour at 160° C. under 1000 pounds per square inch. A sample of the pressed sheet showed no evidence of plastic memory or flow after 7 minutes at 150° C. A control of uncured polyethylene flowed within 30 seconds at the same temperature. This cured polymer did not dissolve in boiling benzene whereas uncured Alathon #7 dissolved under the same conditions.

EXAMPLE 9

A total of 100 parts of polyethylene (DYNH) were milled into a smooth sheet at 120° C. and 1.18 parts of crystalline tert-butyl-triphenyl methyl peroxide were added. This sheet was pressed 30 minutes at 160° C. A strip cut from this sheet did not flow in 10 minutes at 150° C. and swelled in hot 80–90° C. toluene. This sheet exhibited no plastic memory or flow after 7 minutes at 150° C. whereas a control of uncured polyethylene flowed within 30 seconds at the same temperature.

EXAMPLE 10

A total of 100 parts of polyethylene (DYNH) were heated on a rubber mill at 120° C. and 1.54 parts of tert-butyl-α-cumyl peroxide were added. The blend was pressed for ½ hour at 160° C. A strip of this material did not flow after 10 minutes at 150° C. and a sample of the same swelled in toluene at 80–90° C. This sample did not exhibit plastic memory after 7 minutes at 150° C.

EXAMPLE 11

Di-α,p-cymyl peroxide (1 part) was dispersed in 100 parts of DYNH polyethylene by milling on a rubber mill at 120° C. The resulting blend was pressed 30 minutes at 160° C. A strip cut from this sheet swelled in boiling toluene and had the following properties:

| | Room Temperature | 145° C. |
|---|---|---|
| Tensile strength (p.s.i.) | 2,490 | 106 |
| Elongation (Percent) | 800 | 700 |

The sample of the pressed sheet showed no evidence of plastic memory or flow after 7 minutes at 150° C. A control of uncured polyethylene flowed within 30 seconds at the same temperature.

From the foregoing, it is readily apparent that peroxide-cured polyethylene prepared in accordance with this invention greatly enhances the form stability of polyethylene. These peroxide-cured polyethylenes as described also possess good solvent resistance, improved tensile strength, and tear strength, etc. These properties make the new materials particularly useful as insulating tape, wire coatings, spark plug insulators, gaskets, etc. Thus, these polymeric materials prepared according to this invention can be used advantageously in the electrical applications where polyethylene itself had been unsuccessful because of its inability to withstand elevated temperatures. These materials may be employed in applications, such as fluid conduit or containers where the uncured polyethylene could not be used because of the presence of solvents or high temperatures. Moreover, by extruding polyethylene into a solution containing peroxides and heat curing the product thereof a case hardening effect can be obtained; that is, the exterior portion of the article can be cured while the interior remains essentially uncured thereby making possible new molding techniques, melting and removing the interior, new variable property articles, etc.

The compositions of this invention whether they be molding powders, solutions, dispersions, or porous masses can also be advantageously used for extrusion into filaments, sheets, rods, tubes, and over wire to produce insulating coatings. These compositions may also be injection or compression molded, callendered, or otherwise fabricated into articles of various shapes. These articles may afterwards be heat-treated at temperatures above their fabricating temperatures to cure the polymer, rendering the article much less soluble in hot solvents and more resistant to deformation at elevated temperatures than uncured polyethylene. Other uses will be apparent to those skilled in the art.

What we claim as new and desire to secure by Letters Patent of the United States is:

1. A composition comprising an admixture of polyethylene and a peroxide of the following formula

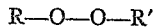

where R and R' are each hydrocarbon radicals containing a tertiary carbon atom attached to each oxygen atom of the peroxide oxygen and at least one of the R's contains at least one aromatic radical.
2. The cured product of claim 1.
3. A composition comprising an admixture of polyethylene and bis(α,α-dimethylbenzyl) peroxide.
4. The cured product of claim 3.
5. A composition comprising an admixture of polyethylene and tert-butyl triphenylmethyl peroxide.
6. The cured product of claim 5.
7. The composition comprising an admixture of polyethylene and α,α-dimethylbenzyl-tert-butyl peroxide.
8. The cured product of claim 7.
9. A process of curing polyethylene which comprises heating polyethylene in the presence of a peroxide having the following formula

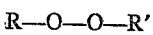

where R and R' are each hydrocarbon radicals containing a tertiary carbon atom attached to each oxygen atom of the peroxide oxygen and at least one of the R's contains at least one aromatic radical.

10. The process of claim 9 in which the peroxide is bis($\alpha,\alpha$-dimethylbenzyl) peroxide.

11. The process of claim 9 in which the peroxide is tert-butyl triphenylmethyl peroxide.

12. The process of claim 9 in which the peroxide is $\alpha,\alpha$-dimethylbenzyl-tert-butyl peroxide.

13. A composition comprising a polymer of ethylene and a minor amount, between about 0.1% and 10% by weight of said polymer, of a di(aralkyl) peroxide of the formula

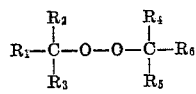

where $R_1$ and $R_6$ are aryl, and $R_2$, $R_3$, $R_4$ and $R_5$ are alkyl radicals of less than 4 carbon atoms.

14. The cured product of claim 13.

15. The process which comprises incorporating a di(aralkyl) peroxide having the formula

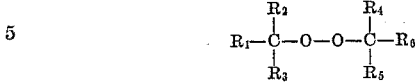

where $R_1$ and $R_6$ are aryl, and $R_2$, $R_3$, $R_4$ and $R_5$ are alkyl groups of less than 4 carbon atoms, into a polymer of ethylene, and heating to effect cross-linking of said polymer, the amount of said peroxide being between about 0.1% and 10% by weight of said polymer.

References Cited in the file of this patent

UNITED STATES PATENTS 2,628,214    Pinkey _____ Feb. 10, 1953
2,826,570    Ivett _____ Mar. 11, 1958

FOREIGN PATENTS 659,958    Great Britain _____ Oct. 31, 1951